United States Patent
Savin et al.

(10) Patent No.: US 12,107,890 B2
(45) Date of Patent: Oct. 1, 2024

(54) NETWORK SECURITY WITH SERVER NAME INDICATION

(71) Applicant: Cujo LLC, Walnut, CA (US)

(72) Inventors: Filip Savin, Vilnius (LT); Leonardas Marozas, Vilnius (LT); Kimmo Kasslin, Espoo (FI)

(73) Assignee: Cujo LLC, Covina, CA (US)

( * ) Notice: Subject to any disclaimer, the term of this patent is extended or adjusted under 35 U.S.C. 154(b) by 252 days.

(21) Appl. No.: 17/719,117

(22) Filed: Apr. 12, 2022

(65) Prior Publication Data
US 2023/0328102 A1 Oct. 12, 2023

(51) Int. Cl.
*H04L 9/40* (2022.01)
*H04L 61/4511* (2022.01)
*H04L 67/02* (2022.01)

(52) U.S. Cl.
CPC ........ *H04L 63/166* (2013.01); *H04L 61/4511* (2022.05); *H04L 63/0876* (2013.01); *H04L 67/02* (2013.01)

(58) Field of Classification Search
CPC ............... H04L 63/166; H04L 61/4511; H04L 63/0876; H04L 67/02
See application file for complete search history.

(56) References Cited

U.S. PATENT DOCUMENTS

| | | | |
|---|---|---|---|
| 11,271,902 B2 | 3/2022 | Moore et al. | |
| 11,336,692 B1 * | 5/2022 | McCorkendale | ... H04L 63/1441 |
| 11,838,262 B1 * | 12/2023 | Kangas | .............. H04L 63/14 |
| 2021/0112060 A1 * | 4/2021 | Billawala | .............. H04L 63/101 |
| 2021/0258350 A1 * | 8/2021 | Buck | .............. H04L 63/20 |
| 2022/0103680 A1 | 3/2022 | Sopic et al. | |
| 2023/0015687 A1 * | 1/2023 | Parla | .............. H04L 45/645 |
| 2023/0164119 A1 * | 5/2023 | Kasslin | .............. H04L 63/166 726/12 |
| 2023/0224248 A1 * | 7/2023 | Mestery | .............. H04L 69/165 370/389 |
| 2023/0291813 A1 * | 9/2023 | Parla | .............. H04L 47/2475 |

(Continued)

OTHER PUBLICATIONS

Extended European Search Report for EP Patent Application No. 23151062.9, dated Sep. 7, 2023, 6 pages.

(Continued)

*Primary Examiner* — Harris C Wang
(74) *Attorney, Agent, or Firm* — Dority & Manning, P.A.

(57) ABSTRACT

A computing device receives an IP address and a port number related to a transport protocol and an application protocol version and other attributes related to an application protocol extracted from an encrypted client hello (ECH) enabled transport layer security (TLS) connection request from a client computing device and extracts, from the database, a set of all known hostnames matching the IP address. The device generates a reduced list of the set of all hostnames matching the IP address, and assigns a confidence score to each hostname of the reduced list based on an alias count and/or a popularity ranking of the hostname. Finally, a prioritized list of one or more hostnames is generated based on the confidence score, the prioritized list indicating the one or more hostnames in the order of descending probability of being requested in the ECH enabled TLS connection request.

20 Claims, 3 Drawing Sheets

(56) References Cited

U.S. PATENT DOCUMENTS

2023/0328102 A1* 10/2023 Savin ................. H04L 63/0442
                                                                  726/4

OTHER PUBLICATIONS

Martino, Mariano Di, et al., "Knocking on IPs: Identifying HTTPS Websites for Zero-Rated Traffic," Hindawi, Security and Communication networks, vol. 2020, Article ID 7285786, https://doi.org/10.1155/2020/7285786, Aug. 28, 2020, 14 pages.
Notice of Intention to Grant for EP Patent Application No. 23151062.9, dated May 21, 2024, 31 pages.

* cited by examiner

200 RECEIVE AN IP ADDRESS AND A PORT NUMBER RELATED TO A TRANSPORT PROTOCOL AND AN APPLICATION PROTOCOL VERSION AND OTHER ATTRIBUTES RELATED TO AN APPLICATION PROTOCOL EXTRACTED FROM AN ENCRYPTED CLIENT HELLO (ECH) ENABLED TRANSPORT LAYER SECURITY CONNECTION (TLS) REQUEST FROM A CLIENT COMPUTING DEVICE

201 EXTRACT, FROM A DATABASE OF HOSTNAME TO INTERNET PROTOCOL (IP) ADDRESS MAPPINGS RELATED TO A COLLECTED LIST OF KNOWN HOSTNAMES AND RESOLUTIONS OF THE KNOWN HOSTNAMES, A SET OF ALL HOSTNAMES MATCHING THE IP ADDRESS

202 GENERATE A REDUCED LIST OF THE SET OF ALL HOSTNAMES MATCHING THE IP ADDRESS BY: REMOVING KNOWN HOSTNAMES THAT DO NOT SUPPORT THE ECH EXTENSION OF THE TLS STANDARD, REMOVING INTERMEDIATE CONTENT DISTRIBUTION NETWORK (CDN) HOSTNAMES, AND REMOVING HOSTNAMES THAT DO NOT SUPPORT THE APPLICATION PROTOCOL VERSION, SERVICE ON THE PORT NUMBER AND THE TRANSPORT PROTOCOL

203 ASSIGN A CONFIDENCE SCORE TO EACH HOSTNAME OF THE REDUCED LIST OF THE SET OF ALL HOSTNAMES BASED ON AT LEAST ONE OF: AN ALIAS COUNT OF THE HOSTNAME AND A POPULARITY RANKING OF THE HOSTNAME

204 GENERATE A PRIORITIZED LIST OF ONE OR MORE HOSTNAMES OF THE REDUCED LIST OF THE SET OF ALL HOSTNAMES BASED ON THE CONFIDENCE SCORE, THE PRIORITIZED LIST INDICATING THE ONE OR MORE HOSTNAMES IN THE ORDER OF DESCENDING PROBABILITY OF BEING REQUESTED IN THE ECH ENABLED TLS CONNECTION REQUEST FROM THE CLIENT COMPUTING DEVICE

FIG. 2

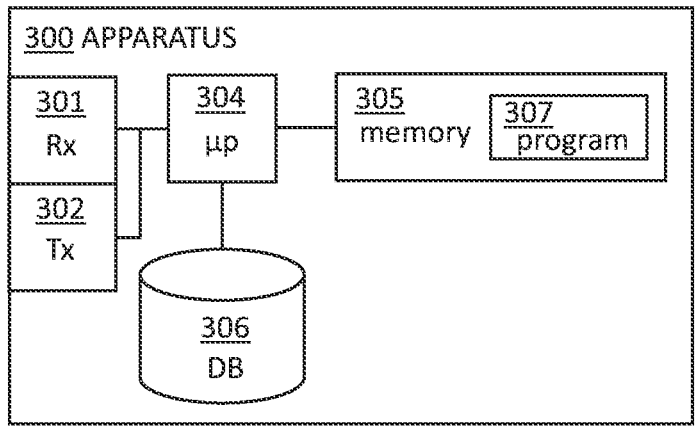

FIG. 3

NETWORK SECURITY WITH SERVER NAME INDICATION

TECHNICAL FIELD

The present application relates generally to network security, and specifically to network security methods and apparatuses using server name indication.

BACKGROUND

In various network security solutions, connections between network devices must often be authorized by an external service, such as a security service provider or the like. The external service may be used to determine whether the user is allowed to access requested contents or whether the connections should be blocked, for example. Proportion of encrypted web traffic is increasing which raises challenges related to security monitoring of the encrypted traffic.

It can be desirable to manage network connections without risking security at the same time.

SUMMARY

According to an aspect of the invention there is provided a method as specified in claim 1.

According to another aspect of the invention, there is provided an apparatus in a computer network system as specified in claim 13.

According to another aspect of the invention, there is provided a non-transitory computer-readable medium comprising stored program code, the program code comprised of computer-executable instructions that, when executed by a processor device, causes the processor device to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a flow diagram illustrating a method, according to an embodiment;

FIG. 3 is a block diagram of an apparatus, according to one embodiment; and

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
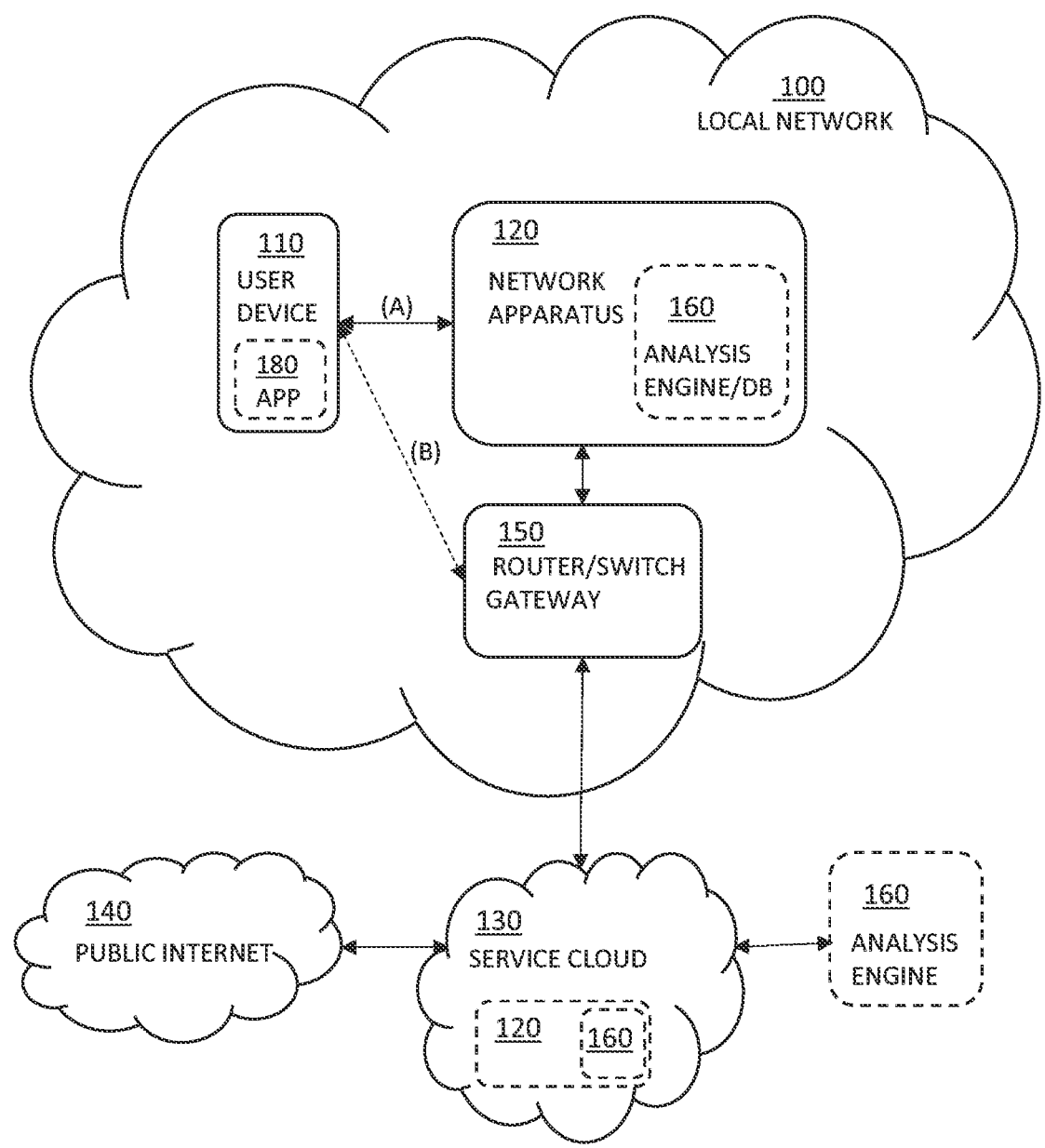
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more computing devices 110 with a client application 180, the network apparatus 120, a local gateway 150, and an analysis engine/database 160. The example system also includes a service cloud 130, such as a network operator's cloud or a security service provider's cloud and the Internet 140. The analysis engine 160, such as a web resource analysis engine, may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the client computing device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The client device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 may collect information, e.g., about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user/client device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the gateway 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

An addition of an encrypted client hello (ECH) extension to transport layer security (TLS) standard is known to break certain network security features such as safe browsing and advanced content control features. The embodiments of the invention provide technological solution to solving the ECH problem.

Server name indication (SNI) is an extension of the TLS protocol that is used to indicate which hostname a client is attempting to connect at the start of the handshaking process. The embodiments of the invention enable ways to deduct the SNI/hostname by using Internet Protocol (IP) related enrichment and classification.

Hypertext transfer protocol secured (HTTPS) monitoring may rely on information exchanged during TLS handshake, such as monitoring the SNI. SNI-based monitoring offers a good solution since it enhances both security and privacy protection as private data is encrypted while only the destination service is known.

Many of the security features rely on the SNI extraction to recognize the user visited domain via the hypertext transfer protocol secured (HTTPS) protocol. SNI is used during the creation of the HTTPS session (handshake) to inform the server which certificates to send to the client for the TLS session establishment. In the first part of the handshake, the client sends a Client Hello message, which is transmitted unencrypted because the client and the server do not have a shared secret yet. Since the domain can be observed in plain text in the Client Hello message, the name of a website being visited can be extracted and checked for the website reputation via a uniform resource locator (URL) reputation checker for example.

However, with the privacy-enhanced solution ECH (initially named as encrypted server name indication (ESNI) and later deprecated in favor of TLS 1.3, ECH extension draft), where most of the Client Hello data is encrypted, a safe browsing solution, for example, would be broken as it would no longer be possible to extract a domain name. In ECH, SNI is placed in an inner encrypted part of the Client Hello message. This will break not only a safe browsing solution but also other solutions depending on SNI extraction.

Internet Protocol (IP) is a computer network protocol that all devices on the Internet must use to communicate with one another. Embodiments of the invention provide a methodology for accurately mapping Internet Protocol addresses (IP addresses) and also enriching them with enough context to a list of domains hosted (where applicable) and thus keeping an inventory of enough data to make a decision about the web reputation of a visited domain and overcoming the problem of the Client Hello message being encrypted and the visited domain no longer being visible in plain text. Thus, for example blocking or termination encrypted connections are enabled without risking security.

Whenever a selected device initiates a request on port 443 (HTTPS), a safe browsing protection agent may extract the SNI from the request and if no web reputation data is available in the agent domain cache for the extracted server, then a web reputation request may be made to a URL checker service. With the ECH TLS extension, the TLS Client Hello data is split in two parts: an outer (plain text) part and an inner (encrypted) part. The SNI is stored in the encrypted part and it is not extractable. However, the embodiments of the invention enable determining the SNI(s) and passing them to the URL checker service for calculating a final web reputation for the request.

For the ECH to work, both client and server must support it and the client has to use an asymmetric cryptographic key in order to encrypt the inner part of the Client Hello message. For key delivery, as well as other modern HTTPS specific parameters, a new DNS resource record types (RR) are introduced: service binding (SVCB) and its specific case, HTTPS. The purposes of these are to provide alternative endpoint (HTTP3/QUIC, on non-default TCP and UDP ports) without making initial traditional HTTP(S) connection and parsing alt-svc response header, support for alternative endpoints when using canonical name record in domain name system (CNAME) aliasing to different content delivery networks (CDNs) (different servers supporting a different set of parameters), enable CNAME-like functionality at a zone apex (i.e., CNAME'ing example.com to example.net), connect directly to HTTP3/QUIC alternative endpoints, provide HTTP Strict Transport Security (HSTS)-like indication—the presence of this record means choosing HTTPS scheme by default (such as already received HTTP 307 redirect to https://URL), and provide ECH configuration parameters (e.g. keys, ciphers) in echconfig parameter.

Best case scenario is when a single IP address is used to host a single domain. Based on a specific data analysis on a tested list of 480,000 domains in total performed by the inventors, results show that 61% of the Internet hosted domain subset, consisting of combined Alexa, Majestic, Umbrella top 100,000 lists are mapped one to one. While a solution to a best-case scenario may seem trivial, the embodiments of the present invention focus on covering all possible scenarios.

As part of the method flow in an embodiment, continuous monitoring of ECH adoption is established and any changes for the current ECH draft might result in minimal changes of technical details of the invention steps as well.

FIG. 2 is a flow diagram illustrating an embodiment of a method in a network system.

In 200, a computing device receives at least an IP address and a port number related to a transport protocol and an application protocol version and all other attributes related to an application protocol extracted from an encrypted client hello (ECH) enabled transport layer security (TLS) connection request from a client computing device. Examples of the transport protocols comprise the transmission control protocol (TCP) and user datagram protocol (UDP). However, other transport protocols have also been defined and implemented, such as a datagram congestion control protocol (DCCP) and a stream control transmission protocol (SCTP). The port number is the part of the addressing information used to identify the senders and receivers of messages in the computer network. Different port numbers are used to determine what protocol incoming traffic should be directed to. The application protocol version refers to application layer protocols that provide rules for communication between applications. The application layer protocols define how application processes running on different end systems, pass messages to each other. Examples of application layer protocols in the TCP/IP protocol suite include, for example, (domain name system) DNS, dynamic host configuration protocol (DHCP) and file transfer protocol (FTP). In the ECH cases, the application layer protocol may comprise any of such used in the application-layer protocol negotiation (ALPN).

In 201, the computing device extracts a set of all known hostnames matching the received IP address from a database of hostname to Internet Protocol (IP) address mappings related to a collected list of known hostnames and resolutions of the known hostnames.

In 202, the computing device generates a reduced list of the set of all hostnames matching the received IP address. The reducer process comprises at least removing hostnames that do not support an ECH extension of a TLS standard, removing intermediate content distribution network (CDN) hostnames, and removing hostnames that do not support the application protocol version, service on the port number and the transport protocol. Content delivery networks (CDN) are known in the art for delivering content (e.g., web resources) on behalf of one or more content providers. The CDN hostname refers to a unique domain name provided by the CDN provider for enabling CDN services for its clients. In an embodiment, the intermediate CDN hosts may be removed by filtering out all known hostnames that have alias (CNAME and HTTPS target) counts higher than a predetermined threshold value (e.g., 1-3). CNAMEs are general aliases for hostnames.

In 203, the computing device assigns a confidence score to each hostname of the reduced list of the set of all hostnames based on at least one of: an alias count of the hostname and a popularity ranking of the hostname.

In 204, the computing device generates a prioritized list of one or more hostnames of the reduced list of the set of all hostnames based on the confidence score, the prioritized list indicating the the one or more hostnames in the order of descending probability of being requested in the ECH enabled TLS connection request from the client computing device.

In an embodiment, a reputation information related to each hostname of the prioritized list of the one or more hostnames is retrieved for protecting the client computing device and/or a computer network based on the reputation information.

In an embodiment, the client computing device and/or a computer network are protected based on the reputation information by one or more of: reporting a user of the client computing device and/or a computer network owner of the reputation information related to the connection request, blocking the connection, and applying other security measures to protect the client computing device and/or the computer network.

In an embodiment, the database of hostname to IP address mappings related to the collected list of known hostnames and resolutions of the known hostnames are maintained, and the domain name system (DNS) resolutions of the hostnames to IP addresses are provided by collecting a list of hostnames and performing resolutions of the hostnames collected. The database comprises at least data from hypertext transfer protocol secure service binding and parameter specification (HTTPS) resource records (RR).

In an embodiment, the data related to the DNS resolutions of the known hostnames is processed and stored to the database of hostname-to-Internet protocol (IP) address mappings, wherein the stored data further comprises one or more of: a resolved internet protocol version address, a canonical name chain and a popularity ranking of a domain related to the hostnames. A canonical name (CNAME) is used in the DNS to create an alias from one domain name to another domain name. The popularity ranking of domains may be based on various popularity ranking results from website traffic amount comparison services, for example. Popularity measure may be based on one or more different ranking models that may use various attributes in their popularity measurements.

In an embodiment, collecting the list of known hostnames comprises collecting the known hostnames from one or more sources of: a domain popularity list, hostnames crawled and extracted from uniform resource locators (URLs), feeds related to new domains, feeds related to certificate transparencies.

In an embodiment, removing the set of hostnames that do not support the ECH extension of the TLS standard comprises filtering out address type records that do not have a corresponding HTTPS RR with an ECH configuration parameter and respective canonical name records thereof.

In an embodiment, generating the reduced list further comprises matching data extracted from a TLS session handshake related to the TLS connection request with the hostname-to-Internet Protocol (IP) address pairs in the database.

In an embodiment, removing the intermediate CDN hostnames comprises filtering out all hostnames that have an alias count higher than a predetermined threshold.

In an embodiment, removing hostnames that do not support the application protocol version and removing hostnames that do not support service on the provided port number further comprise removing the hostnames that do not support the application protocol version and removing hostnames that do not support service on the port number based on the data from the HTTPS service binding and parameter specification resource records (RR).

In an embodiment, the confidence score is dependent on the alias count such that the lesser the alias count, the higher the confidence score. Further, the confidence score is dependent on the popularity ranking of the hostname such that the higher the popularity ranking, the higher the confidence score. Thus, higher confidence scores may be assigned to hostnames having no aliases and to hostnames that are more popular based on a crawling data and/or popularity ranking lists, for example.

In an embodiment, the application protocol version is a hypertext transfer protocol version 3 (HTTP3) or a general purpose transport layer network protocol (QUIC) or any application protocol sub-versions of the HTTP3 or QUIC.

In an embodiment, based on the determined hostname(s) requested in the ECH enabled TLS connection request from the client computing device, further action is made to protect the computer network system. The further action may comprise reporting a security related incident, controlling or blocking connections or preventing communication between a first device and a second device, and applying other security measures to protect the computer network system and/or one or more computing devices of the computer network system.

Turning now to FIG. 3 that is showing an example of a network apparatus such as a gateway or a resolver device or a computing device.

A processor is provided that is configured to receive at least an IP address and attributes related to a transport protocol, a port number and an application protocol version extracted from an encrypted client hello (ECH) enabled transport layer security (TLS) connection request from a client computing device and to extract a set of all known hostnames matching the received IP address from a database of hostname to IP address mappings related to a collected list of known hostnames and resolutions of the known hostnames. A processor is further provided that is configured to perform a reducer process where a reduced list of the set of all known hostnames matching the received IP address is generated by removing hostnames that do not support the ECH extension of the TLS standard, removing intermediate content distribution network (CDN) hostnames, and removing hostnames that do not support the application protocol version, service on the port number and the transport protocol. The processor is further configured to perform a prioritizer process where first a confidence score is assigned to each hostname of the reduced list of the set of all hostnames based on at least one of:

an alias count of the hostname and a popularity ranking of the hostname and generate a prioritized list of one or more hostnames of the reduced list of the set of all known hostnames based on the confidence score. The prioritized list indicates the one or more hostnames in the order of descending probability of being requested in the ECH enabled TLS connection request from the client computing device.

In an embodiment, the processor 304 is further configured to store data such as data related to the connection requests, hostnames, state information, reputation data and domain data to the database 306. The database 306 is shown in this example as being located at the apparatus 300, but it will be appreciated that the apparatus 304 may alternatively access a remote database. The database 304 may comprise data collected from user devices or reputation data previously collected from the web resource analyzer engine.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processors.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Figure 4:
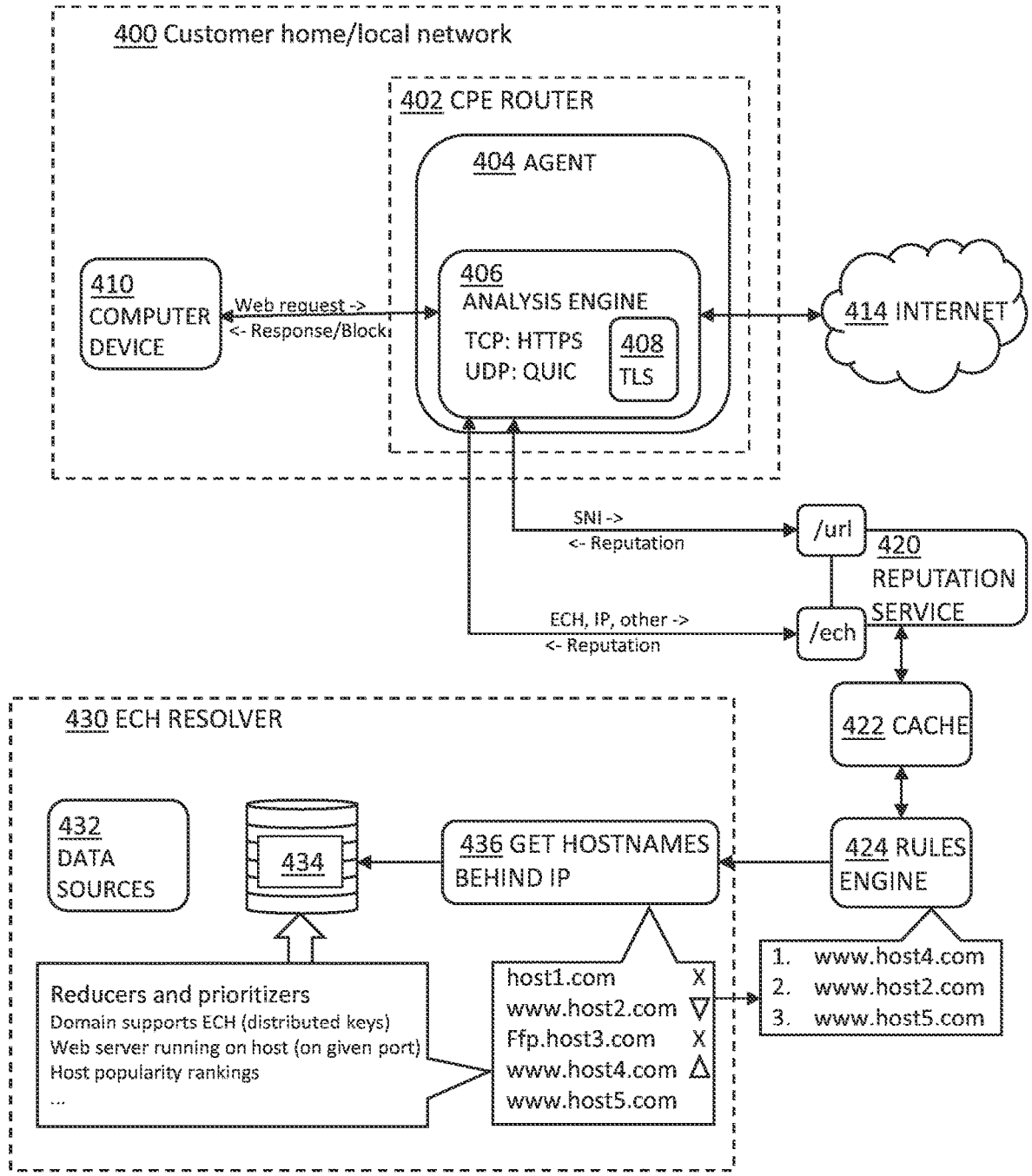
FIG. 4 illustrates another example of a system environment for an apparatus in a computer network system.

FIG. 4 illustrates an example of a system environment for apparatuses in a computer network system. It shows one end-to-end functionality implementation example with a computing device, such as a resolver device 430 or an ECH resolver, in the computer network system. The system environment illustrated in FIG. 4 includes a local network 400 that may include one or more computing devices 410, a customer premises router or a local gateway 402, and an agent device 404 comprising a packet analysis engine 406 and a TLS entity 408. Some examples of a low level packet analysis that the packet analysis engine may use comprise NFLua (a netfilter extension targeting advanced application-level filtering using Lua), NetFilter queues, NetFilter specific/custom modules, eBFP technology, libpcap libraries, etc. The example system also includes a service cloud having a URL and ECH IP reputation service entity 420, a cache of rules engine result for reputation calculation and distribution 422 and a rules engine 424 for assigning reputation to ECH resolution result, such as a network operator's cloud or a security service provider's cloud and the Internet 414. The ECH resolver service, including the ECH resolver 430, may reside in the local network, in the service cloud or elsewhere in the network, and it comprises at least an entity for determining the hostnames behind IP addresses received 436, a reducer and prioritizer engines 434 and at least an access to data sources 432. There may also be further analysis engines and/or ECH resolvers thus enabling at least part of the analysis being processed in more than one analysis engines. Alternative embodiments may include more, fewer, or different components from those illustrated in FIG. 4, and the functionality of each component may be divided between the components differently from the description below.

Steps for determining hostnames based on ECH data comprise three main phases according to an embodiment: 1. Collecting DNS resolutions of hostnames to IP addresses (including CNAME and HTTPS RR), 2. Maintaining the database of hostname to IP address mappings (including additional attributes to be used in steps 3*b* and 3*c*), and 3. Processing the IP address and additional attributes by an ECH resolver service, which a) Determines candidate list of possible hostnames for the received IP address, b) Reduces the list of candidate hostnames using the reducer process, and c) Prioritizes the list of candidate hostnames by assigning a confidence score using the prioritizer process.

In an embodiment, providing the DNS resolutions of hostnames to IP may consist of collecting the list of hostnames and performing resolutions of the hostnames collected. Possible sources for the hostnames include one or more of: domain popularity lists, crawling and extracting hostnames from URLs, new domain feeds and certificate transparency feeds.

An example response is shown below when performing the resolutions of hostnames collected:

```
 1   {
 2       "data": {
 3           "answers": [
 4               {
 5                   "class": "IN",
 6                   "name": "crypto.cloudflare.com",
 7                   "priority": 1,
 8                   "svcparams": {
 9                       "alpn": ["h2"],
10                       "echconfig":
[0,71,254,9,0,67,0,19,99,108,111,117,100,102,108,97,114,101,45,101,11
5,110,105,46,99,111,109,0,32,32,106,44,124, 138,22,232,137,234,8,209,
5,4,166,137,255,145,199,38,112,32,49,60,48,197,90,110,113,187,204,47,
102,0,32,0,4,0,1,0,1,0,0,0,0,0],
11                       "ipv4hint": ["162.159.135.79", "162.159.136.79"],
12                       "ipv6hint": ["2606:4700:7::a29f:874f",
                              "2606:4700:7::a29f:884f"]
13                   }
14                   "target": ".",
15                   "ttl": 300,
16                   "type": "HTTPS"
17               }
18           ],
19           "protocol": "udp",
20           "resolver": "1.1.1.1:53"
21       },
22       "name": "crypto.cloudflare.com",
23       "status": "NOERROR",
24       "timestamp": "2021-03-23T18:39:50+02:00"
25   }
```

By building the database, it is possible to monitor ECH adoption by looking at the number of HTTPS RR responses that contain echconfig in the svcparams field, the presence of echconfig in a svcparams field indicating that the received hostname supports ECH and distributes required keys.

In the second step of maintaining the database of hostname-to-IP address mappings, the resolutions data from the first step is processed and stored to the database. The purpose of the database is to provide data for determining ECH-protected hostname using provided IP address. Thus, the resolution data is stored, including a whole CNAME chain, resolved IPv4 and IPv6 addresses, and data from HTTPS RR (priority, IPv4/6 hints, svcparams, etc.). Further, hostnames may be enriched with popularity rankings, if available. The database can be located in the in the service cloud, in the ECH resolver 430 or elsewhere in the network.

A computer device 410 of a local network 400 transmits an ECH-enabled TLS client hello connection request. A network device, such as the agent 404 of the local network router 402 receives at least an IP address and the additional attributes from the connection request and forwards them to the ECH resolver 430 in the third step. The IP address and other attributes, such as transport protocol, transport port, HTTP/QUIC version, extracted from the ECH-enabled TLS client hello is received by the ECH resolver service. The ECH resolver 430 first determines possible hostname candidates for the IP address. All known hostnames that match the given IP address are extracted from the database. Next, the ECH resolver reducer process outputs a reduced number of hostnames from the previous possible hostname candidates by applying one or more of the following methods: removing hostnames that do not support ECH by filtering out A type records that do not have corresponding HTTPS RR with echconfig and their related CNAMEs, removing intermediate CDN hosts by filtering out all records that have an alias (CNAME and HTTPS target) counts higher than the configured threshold (e.g. 1-3), removing hostnames that do not support provided HTTP/QUIC version (using HTTPS RR), and removing hostnames that do not support service on provided port (using HTTPS RR).

In the use case example of FIG. 4, the reduced list of hostnames include host1.com, www.host2.com, ffp.host3.com, www.host4.com and www.host5.com. An input for the final ECH resolver prioritizer process is this reduced number of hostnames from the reducer process and an outcome of the prioritizer process is a list of hostnames with their weight scores. For example, in the use case example of FIG. 4, the hostnames host1.com and ffp.host3.com are removed in the reducer process and the remaining hostnames, www.host2.com (weight score lowers the value of this hostname), www.host4.com (weight score improves the value of this hostname), and www.host5.com are given weight scores. In an embodiment, the prioritization may be based on two approaches: reducing weight for hostnames with aliases and adding popularity-based rankings. In an embodiment, the prioritizer process may comprise assigning a higher confidence (or a weight) score to hostnames without aliases (CNAMEs and HTTPS RR target) and assigning higher confidence scores (or weights) to hostnames that are more popular (based on crawling data as well as popularity rankings lists). The result is a prioritized list of hostnames (ideally one hostname) that were most probably requested in the ECH enabled TLS session. In the use case example of FIG. 4, the prioritized list of hostnames comprise following hostnames in the order of their values based on the assigned weight scores: www.host4.com, www.host2.com and www.host5.com.

After executing the previously described steps, the entries of end-result may be passed over to a web reputation checking service: an URL-checking entity 420 and a reputation calculation and distribution entity 422. The resulting reputation is combined (possibly with an addition or original IP reputation) and final reputation may be produced and sent to the local network 402 that then initiates further actions based on the reputation received.

The reducers and prioritizers used in the process can be based on Internet engineering task force (IETF) draft on ECH/ESNI, a hybrid public key infrastructure solution (HPKI), and HTTPS/SVCB records, for example. The applicability depends on the actual deployment. Related to the reducers, data extracted from TLS session handshake (IP, port, protocol, etc.) is matched against pre-collected database of hostnames-IP pairs (from DNS and crawling). The handshake data and the corresponding database match may be found based on the following data, for example: Destination IP, Resolved IP, HTTPS RR (IPv4/6 hints, ALPN), Destination port application-layer protocol negotiation (ALPN), HTTP protocol ALPN, ECH InnerClientHello presence of echconfig field in HTTPS RR, ECH version echconfig.version, public name echconfig.contents.public_name (incl. additional HTTPS RR obtaining for this name), ECH HPKI KEM echconfig.contents.kem_id, ECH cipher suite echconfig.contenst.cipher_suites, other ECH fields* echconfig.contents.extensions, ECH config id echconfig[ ] in HTTPS RR, applied to all echconfig.* matches, InnerClientHello length, Hostname length with padding (32 by default). Other attributes that may be taken into account in the reducer process may be related to timing (e.g., considering time since and/or between specific data) and padding (padding of what exactly: e.g., whole TLS ClientHello), for example. In an embodiment, ALPN can be crawled or extracted from HTTPS RR. Further, a dedicated DNS HTTPS RR can be present for alternate ports, ex. _444._https.example.com. In an embodiment, possible echconfig.contents.extensions can affect construction of ECH fields in TLS.

Prioritizers in the prioritizer process may be based on the popularity rankings (such as from Alexa, Umbrella, etc.) and HTTPS RR SvcPriority.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises one or more codes for performing the process steps according to the described example embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:
1. A method comprising:
receiving, by a computing device, an IP address and a port number related to a transport protocol and an application protocol version and other attributes related to an application protocol extracted from an encrypted client hello (ECH) enabled transport layer security (TLS) connection request from a client computing device;

extracting, by the computing device from a database of hostname to Internet Protocol (IP) address mappings related to a collected list of known hostnames and resolutions of the known hostnames, a set of all hostnames matching the IP address;

generating, by the computing device, a reduced list of the set of all hostnames matching the IP address by:
 removing hostnames that do not support an ECH extension of a TLS standard;
 removing intermediate content distribution network (CDN) hostnames; and
 removing hostnames that do not support the application protocol version, service on the port number, and the transport protocol;

assigning, by the computing device, a confidence score to each hostname of the reduced list of the set of all hostnames based on at least one of: an alias count of the hostname and a popularity ranking of the hostname; and generating, by the computing device, a prioritized list of one or more hostnames of the reduced list of the set of all hostnames based on the confidence score, the prioritized list indicating the one or more hostnames in the order of descending probability of being requested in the ECH enabled TLS connection request from the client computing device.

2. The method according to claim 1, further comprising retrieving reputation information related to each hostname of the prioritized list of the one or more hostnames for protecting the client computing device and/or a computer network based on the reputation information.

3. The method according to claim 2, further comprising protecting the client computing device and/or the computer network based on the reputation information by one or more of: reporting a user of the client computing device and/or a computer network owner of the reputation information related to the ECH enabled TLS connection request, blocking a connection, and applying other security measures to protect the client computing device and/or the computer network.

4. The method according to claim 1, further comprising:
 maintaining the database of hostname to Internet Protocol (IP) address mappings related to the collected list of known hostnames and the resolutions of the known hostnames; and
 providing domain name system (DNS) resolutions of the known hostnames to IP addresses by collecting a list of hostnames and performing resolutions of the hostnames collected, wherein the database comprises at least data from hypertext transfer protocol secure service binding and parameter specification (HTTPS) resource records (RR).

5. The method according to claim 4, wherein removing the known hostnames that do not support the application protocol version and wherein removing hostnames that do not support service on the port number further comprise removing the hostnames that do not support the application protocol version and removing hostnames that do not support service on the port number based on the data from the HTTPS service binding and parameter specification RRs.

6. The method according to claim 4, further comprising processing the data related to the DNS resolutions of the known hostnames and storing the data to the database of hostname-to-IP address mappings, wherein the data further comprises one or more of: a resolved IP version address, a canonical name chain, and a popularity ranking of a domain related to the known hostnames.

7. The method according to claim 4, wherein collecting the list of known hostnames comprises collecting the known hostnames from one or more sources of: a domain popularity list, hostnames crawled and extracted from uniform resource locators (URLs), feeds related to new domains, and feeds related to certificate transparencies.

8. The method according to claim 1, wherein removing the set of hostnames that do not support the ECH extension of the TLS standard comprises filtering out address type records that do not have a corresponding HTTPS service binding and parameter specification RR with an ECH configuration parameter and respective canonical name records thereof.

9. The method according to claim 1, wherein generating the reduced list further comprises matching data extracted from a TLS session handshake related to the TLS connection request with hostname-to-IP address pairs in the database.

10. The method according to claim 1, wherein removing the intermediate CDN hostnames comprises filtering out all hostnames that have an alias count higher than a predetermined threshold.

11. The method according to claim 1, wherein the confidence score is dependent on the alias count such that the lesser the alias count, the higher the confidence score, and wherein the confidence score is dependent on the popularity ranking of the hostname such that the higher the popularity ranking, the higher the confidence score.

12. The method according to claim 1, wherein the application protocol version is a hypertext transfer protocol version 3 (HTTP3) or a general purpose transport layer network protocol (QUIC).

13. An apparatus in a computer network system comprising:
 one or more processor devices, the one or more processor devices configured to:
  receive an IP address and and a port number related to a transport protocol and an application protocol version and other attributes related to an application protocol extracted from an encrypted client hello (ECH) enabled transport layer security (TLS) connection request from a client computing device;
  extract a set of all known hostnames matching the IP address from a database of hostname to Internet Protocol (IP) address mappings related to a collected list of known hostnames and resolutions of the known hostnames;
  generate a reduced list of the set of all hostnames matching the IP address by:
   removing hostnames that do not support the ECH extension of a TLS standard;
   removing intermediate content distribution network (CDN) hostnames; and
   removing hostnames that do not support the application protocol version, service on the port number, and the transport protocol;
  assign a confidence score to each hostname of the reduced list of the set of all hostnames based on at least one of: an alias count of the hostname and a popularity ranking of the hostname; and
  generate a prioritized list of one or more hostnames of the reduced list of the set of all known hostnames based on the confidence score, the prioritized list indicating the one or more hostnames in the order of descending probability of being requested in the ECH enabled TLS connection request from the client computing device.

14. The apparatus according to claim 13, the one or more processor devices being further configured to retrieve reputation information related to each hostname of the prioritized list of the one or more hostnames for protecting the client computing device and/or a computer network based on the reputation information.

15. The apparatus according to claim 14, the one or more processor devices being further configured to protect the client computing device and/or the computer network based on the reputation information by one or more of: reporting a user of the client computing device and/or a computer network owner of the reputation information related to the ECH enabled TLS connection request, blocking a connection, and applying other security measures to protect the client computing device and/or the computer network.

16. The apparatus according to claim 13, the one or more processor devices being further configured to:
    maintain the database of hostname to IP address mappings related to the collected list of known hostnames and the resolutions of the known hostnames; and
    provide domain name system (DNS) resolutions of the known hostnames to IP addresses by collecting a list of known hostnames and performing resolutions of the known hostnames; and
    wherein collecting the list of known hostnames comprises collecting the known hostnames from one or more sources of: a domain popularity list, hostnames crawled and extracted from uniform resource locators (URLs), feeds related to new domains, feeds related to certificate transparencies.

17. The apparatus according to claim 16, the one or more processor devices being further configured to: process data related to the DNS resolutions of the known hostnames and store the data to the database of hostname-to-IP address mappings, wherein the data further comprises one or more of: a resolved IP version address, a canonical name chain, and a popularity ranking of a domain related to the hostnames.

18. The apparatus according to claim 13, the one or more processor devices being further configured to filter out address type records that do not have a corresponding HTTPS service binding and parameter specification RR with an ECH configuration parameter and a respective canonical name records thereof related to removing hostnames that do not support the ECH extension of the TLS standard.

19. The apparatus according to claim 13, the one or more processor devices being further configured to:
    remove the intermediate CDN hostnames by filtering out all hostnames that have an alias count higher than a predetermined threshold, to remove the hostnames that do not support the application protocol version; and
    remove hostnames that do not support service on the port number based on data from the HTTPS service binding and parameter specification RRs.

20. A non-transitory computer-readable medium comprising stored program code, the program code comprised of computer-executable instructions that, when executed by a processor device, cause the processor device to:
    receive an IP address and a port number related to a transport protocol and an application protocol version and other attributes related to an application protocol extracted from an encrypted client hello (ECH) enabled transport layer security (TLS) connection request from a client computing device;
    extract a set of all known hostnames matching the IP address from a database of hostname to Internet Protocol (IP) address mappings related to a collected list of known hostnames and resolutions of the known hostnames;
    generate a reduced list of the set of all hostnames matching the IP address by:
        removing hostnames that do not support the ECH extension of a TLS standard;
        removing intermediate content distribution network (CDN) hostnames; and
        removing hostnames that do not support the application protocol version, service on the port number, and the transport protocol;
    assign a confidence score to each hostname of the reduced list of the set of all hostnames based on at least one of: an alias count of the hostname and a popularity ranking of the hostname; and
    generate a prioritized list of one or more hostnames of the reduced list of the set of all known hostnames based on the confidence score, the prioritized list indicating the one or more hostnames in the order of descending probability of being requested in the ECH enabled TLS connection request from the client computing device.

* * * * *